United States Patent [19]

Borzym

[11] 4,315,449

[45] Feb. 16, 1982

[54] CAM OPERATED CUTOFF MACHINE

[76] Inventor: John J. Borzym, 4820 Schoolbell, Birmingham, Mich. 48010

[21] Appl. No.: 145,648

[22] Filed: May 2, 1980

[51] Int. Cl.³ .............................................. B23D 25/04
[52] U.S. Cl. ...................................... 83/319; 83/320; 83/369
[58] Field of Search ................ 83/319, 294, 295, 369, 83/318, 320

[56] References Cited

U.S. PATENT DOCUMENTS

| | | | |
|---|---|---|---|
| 3,044,336 | 7/1962 | Bock | 83/319 |
| 3,288,011 | 11/1966 | Borzym | 83/319 |
| 3,803,966 | 4/1974 | Plegat | 83/319 |
| 3,919,906 | 11/1975 | Law | 83/319 |
| 4,242,933 | 1/1981 | Famos et al. | 83/319 |

*Primary Examiner*—Donald R. Schran

*Attorney, Agent, or Firm*—Krass, Young & Shivley

[57] ABSTRACT

A flying cutoff comprising a severing mechanism which is capable of displacement with the stock to be severed under the control of a linear motive power source such as fluid accelerator. A ramp-like cam member is disposed above the mechanism and, in combination with a follower roller which is connected to the upper shoe of the mechanism, drives the severing blade through the stock as the mechanism carriage travels along with the stock. At the fully extended position, means are provided to lift the cam member so as to raise the blade out of contact with the stock. CAm surfaces for linear and non-linear power transfer relationships are disclosed. The effective angle of the cam member may be adjusted to vary the power factor. A mechanism is disclosed which allows a cut to be made without linear movement of the die carriage or stock.

25 Claims, 11 Drawing Figures

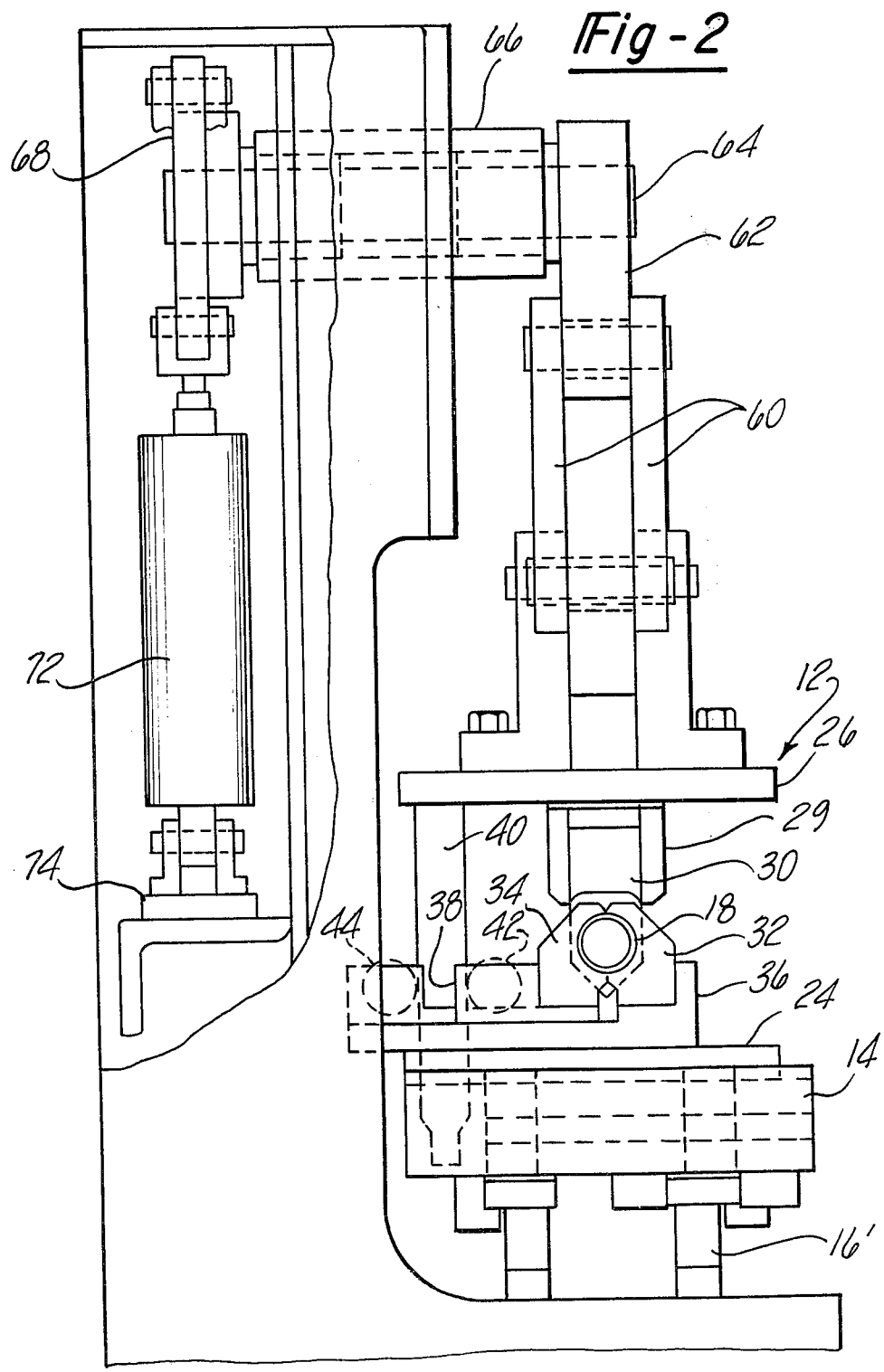

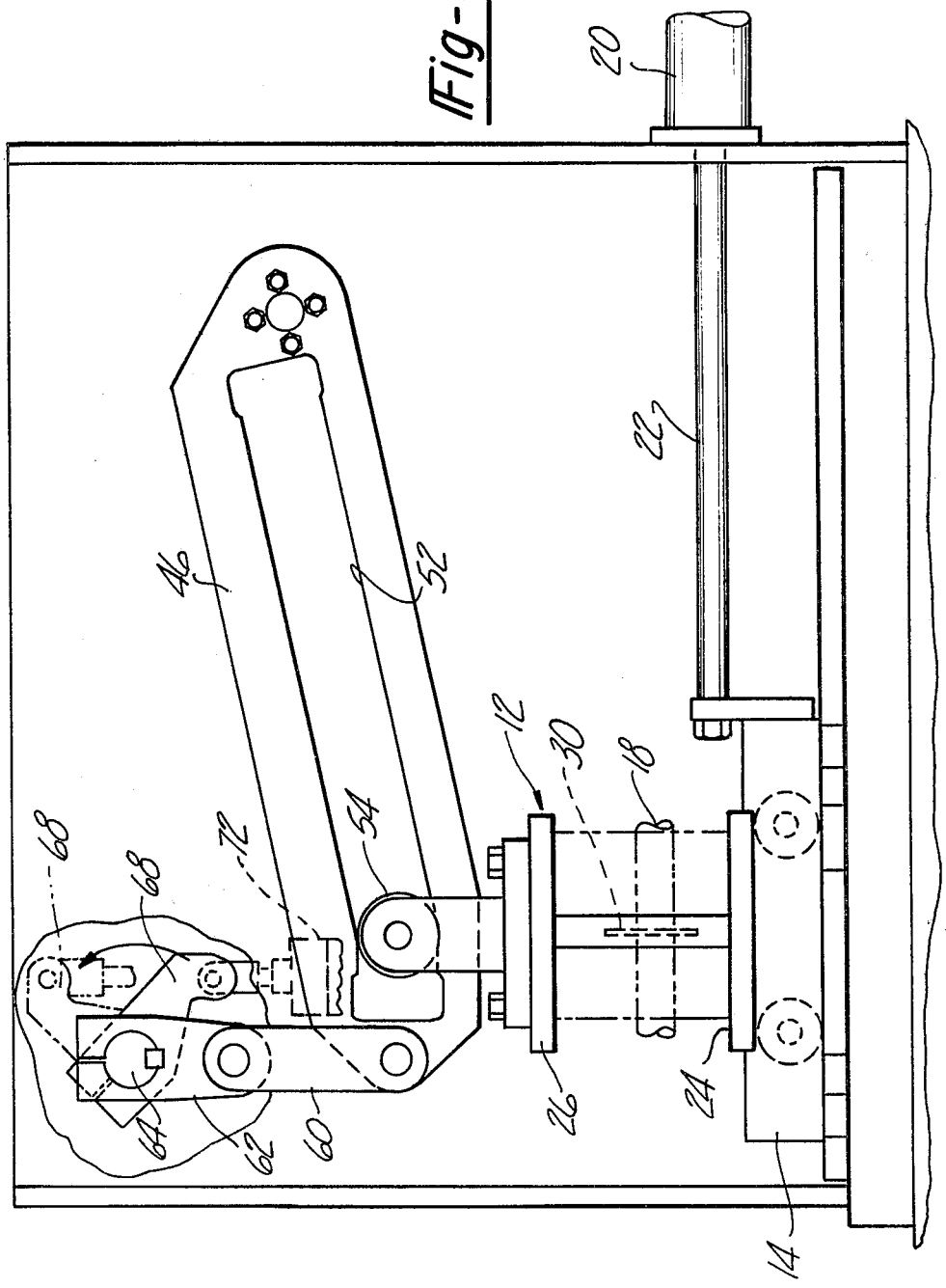

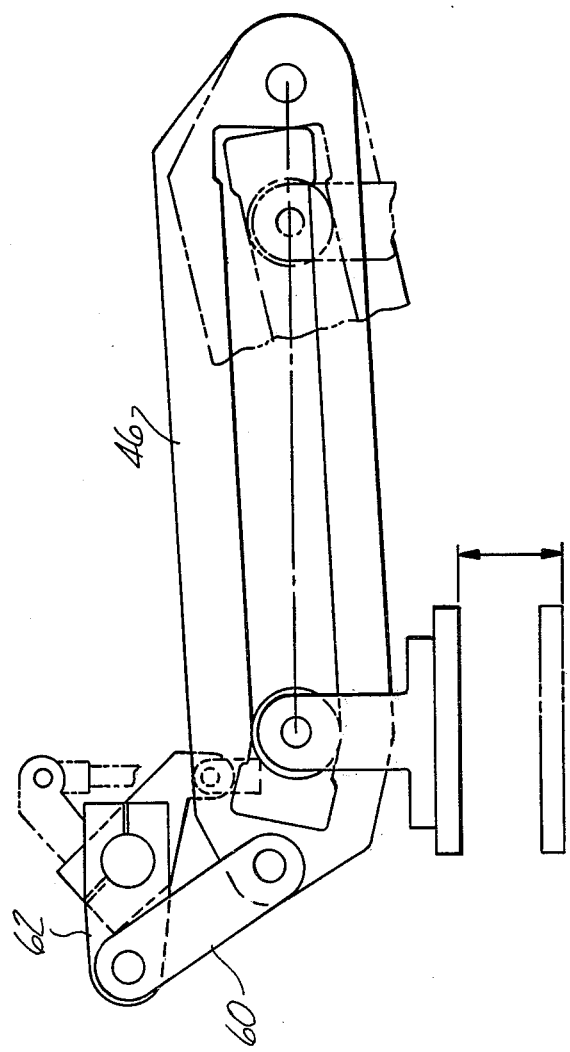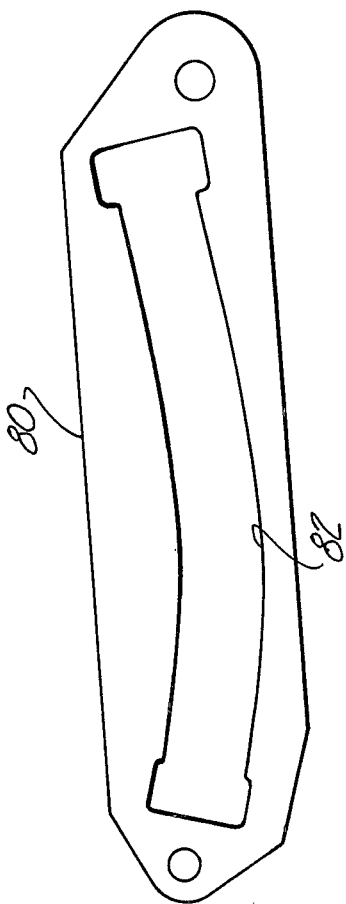

CAM OPERATED CUTOFF MACHINE

This invention relates to flying cutoffs for use in connection with the manufacture of continuous stock such as tubing and rolled shapes. More particularly, the invention pertains to an improved flying cutoff in which a single power source produces both the flying and shearing actions.

BACKGROUND OF THE INVENTION

It is common to produce both tubing and formed shapes in a continuous process. Both tubing and various shapes can be either extruded or continuously formed from flat stock using a rolling or shaping process followed, in many cases, by a seam welding process. At the end of the manufacturing line one typically finds a cutoff of the flying shear type. Essentially a flying shear comprises a base, a carriage mounted on the base for reciprocal movement along a path which is parallel to the path of movement of the stock to be cut, a motive power source such as an air/oil accelerator for reciprocating the carriage between extended and retracted positions and a subassembly such as a die set mounted on the carriage and operable through a reciprocating cycle to shear and withdraw from the stock during the forward motion of the carriage.

A typical cutoff press which has been popular for many years in the tubing industry comprises a base supporting a large motor-driven flywheel whichh is actuated by means of a clutch assembly to transfer mechanical energy to a ram which in turn reciprocates a shearing die set on command. A substantial brake mechanism must be employed in addition to the clutch mechanism to stop the ram and the associated crankshaft at the conclusion of each cycle of operation. In addition to the motor and flywheel for driving the ram, a second independent motive power source such as an air/oil accelerator is utilized to drive the die set along an arrangement of die carriage rails so as to bring the die shearing carriage up to synchronous speed with the stock before initiating the cut. See for example the patents to Alexander Borzym, U.S. Pat. No. 22,114 and U.S. Pat. No. 3,273,433 as examples of flying cutoffs using multiple power sources.

BRIEF SUMMARY OF THE INVENTION

In accordance with the present invention the necessity for multiple power sources to translate and actuate the shearing carriage of a flying cutoff is eliminated. In addition, the need for utilization of a large motor driven flywheel, together with clutch and brake assemblies to actuate the shearing mechanism is eliminated. In general this is accomplished through the use of a simple cam or ramp and follower arrangement disposed between the shearing mechanism and the support base of a cutoff to displace the shearing element through the shearing stroke as a consequence of and in synchronism with the linear translation of the shearing mechanism with the work being cut. Accordingly, the number of motive power sources is reduced to one, the function required being easily furnished by a simple bidirectional power device such as an air/oil accelerator mechanism having the appropriate stroke length and power capability.

A further objective and feature of the invention is the capability of withdrawing the shearing element from the work at the conclusion of the carriage travel in the direction of the stock thereby to clear the shearing carriage for the return stroke to the home (retracted) position. In a preferred form this is accomplished by means of a simple toggel linkage and lower power source operatively connected to the cam member so that the linkage may be locked in one position to produce the shearing stroke upon translation of the carriage, and collapsed to a second condition to withdraw the shearing element for clearance of the stock at the end of the forward translation of the carriage in the shearing cycle.

In a second embodiment of the invention, a cam follower operated by a bell crank mechanism is used to withdraw the shearing element.

Another feature of the invention is the provision of means whereby the power factor or mechanical advantage, stroke length and power profile during a given shearing stroke may all be varied to suit or satisfy a given set of shearing requirements. In general this is accomplished through the provision of a novel cam member which may be varied in angular position and which may be selected in either straight or curved configurations to vary the program of shearing displacement to cutoff carriage displacement. The means by which the angular position of the cam member may be changed also serves to positively lower and raise the shearing element independent of linear translation of the carriage and die set. Thusly, the mechanism may be used to cut stationary stock when so desired.

Still another feature of the invention is a special carriage having wheels for rolling translation of the shearing mechanism along the base during the shearing and return cycles.

Several other features and advantages of the invention will become apparent from a reading of the following specification which describes the best known mode of the invention in such clear and concise detail as to enable persons skilled in the art to make and use the same.

BRIEF DESCRIPTION OF THE DRAWINGS

FIG. 2 is an end view of the mechanism of FIG. 1;

FIG. 3 is a side view of the mechanism of FIG. 1;

FIG. 4 is a further view of a portion of the mechanism of FIG. 1 illustrating the manner of operation of the cam and follower combination;

FIG. 5 is a detailed drawing of an alternative cam member and angular adjustment system for varying the shearing program and the power factor or mechanical advantage and stroke length;

DETAILED DESCRIPTION OF THE ILLUSTRATIVE EMBODIMENTS

Figure 1:
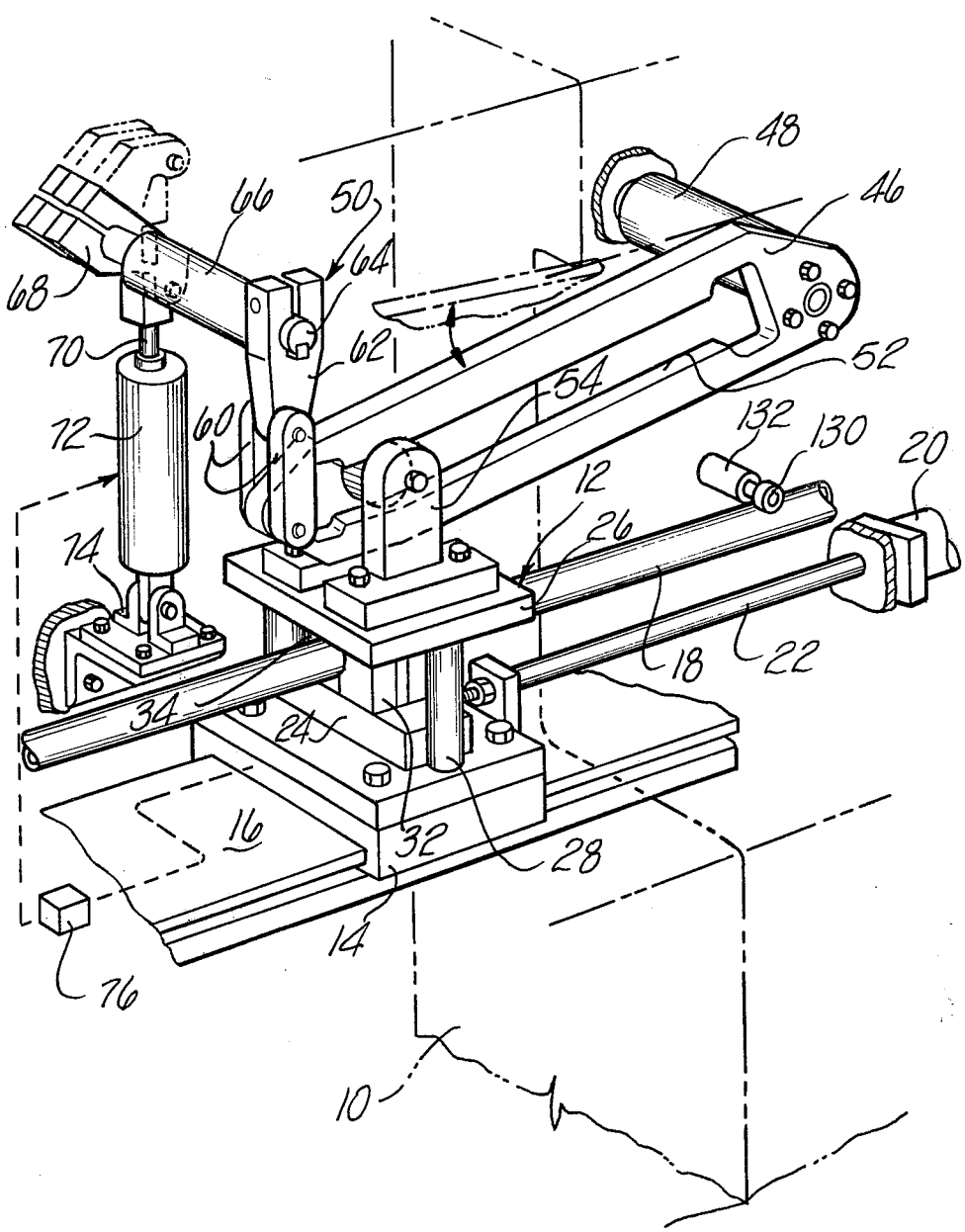
FIG. 1 is a perspective view of a portion of a cutoff machine showing an embodiment of my invention utilizing a straight or linear cam member in combination with a crank-driven toggle linkage to provide a single power source flying cutoff mechanism.

Referring now to FIGS. 1 through 4, an embodiment of my invention is shown to comprise a base 10 in the form of a large rigid weldment to serve as a strong and dimensionally stable support for the remaining elements of the combination, some of which are directly connected to the base and others of which are indirectly connected for angular or linear displacement relative to the base. A die set 12 is mounted on a carriage 14 which in turn is displaceably mounted on a slide rail 16 which is fixed to the base 10 so as to permit linear displacement of the die set 12 and carriage 14 along a finite path parallel to the path of travel of the tubular stock 18. As is well known to those skilled in the art, stock 18 is welded steel tubing emanating from a seam welder which is part of a tube mill which produces stock 18 on a substantially continuous basis. The purpose of the mechanism of FIGS. 1 through 4 is, as will be apparent from the foregoing portion of this specification, to shear or divide the stock 18 into selected lengths which are suitable for handling and shipping or, into such lengths as are susceptible of direct use. Although welded tubing is illustrated in the drawings and will be hereinafter discussed, the invention is applicable to shapes of many descriptions as well as flat stock so long as the shearing operation is within the length and power capabilities of the apparatus into which my invention is incorporated.

Linear translation of the carriage 14 and die set 12 between extended and retracted or home positions is effected by means of an air/oil accelerator 20 having an extensible connector rod 22 by which the carriage 14 is first pushed in the direction of travel of the stock and then pulled back to the home position. It is to be understood that the air/oil accelerator is illustrative only and other hydraulic, pneumatic or mechanical translators can be substituted. The apparatus thus far described in conventional and persons skilled in the art will recognize and appreciate the details of the air and oil cylinders and the interconnections thereof which go to make up the accelerator 20. It will also be appreciated by those skilled in the art that various other devices may supply the motive power requirements of source 20 which, principally, entail the production of a positive driving force in each of two directly opposite directions as well as sufficient power, speed and stroke length. It will be further understood that the power source 20 must be capable of rapid acceleration to a speed which is synchronous with the speed tube 18 relative to the base 10, the necessary speed monitor and synchronizing means being well known in the art at the present time.

The die set 12 further comprises a lower shoe 24 which is mounted on the carriage 14 in fixed relation and an upper shoe 26 which is mounted for vertical reciprocal motion relative to the lower shoe 24 by means of guide pins and bushings 28 which are of a conventional nature. Die set 12 further comprises a blade holder 29 secured to the upper shoe 26 for movement therewith during the shearing cycle and a hardened steel blade or knife 30 mounted in the blade holder 29 and having a sharp pointed end which is driven through the stock 18 to shear the same when the upper shoe is reciprocated relative to the lower shoe during cyclical operation of the die set. For purposes of discussion the two portions of the cyclical operation of the die set 12 shall be known as the shearing stroke or down stroke which occurs typically upon linear translation of the carriage of the direction of travel of stock 18 and the withdrawal or upstroke which occurs at the end of the linear translation of the carriage 14 for the purpose of clearing the blade 30 from the stock 18 so that the carriage may be retracted to the home position.

As best shown in FIG. 2, the die set 12 further comprises a set of die jaws 32 and 34 mounted on respective die slides 36 and 38 to clamp the tubular stock 18 during translation therewith and to release the stock at the conclusion of the shearing stroke and during the return travel of the carriage 14. Again, as best shown in FIG. 2, the necessary limited travel of the die jaws 32 and 34 and the respective die slides 36 and 38 is effected by means of a long cylindrical cam 40 which is dependingly mounted to the upper shoe 26 as to project between a pair of cam follower rollers 42 and 44 which are mounted on the respective die slides 36 and 38. It will be noted from FIG. 2 that when the upper shoe 26 is driven to the lower position wherein the blade 30 has severed the stock 18, a large diameter portion of the cam 40 extends between the follower rollers 42 and 44 to urge the die slides apart thus urging the die jaws together to clamp the stock 18. When the upper shoe 26 is reciprocated back to the withdrawn or retracted position by novel means hereinafter described, a small diameter portion of the cam 40 lies between the rollers 42 and 44, thus to permit the die jaws 32 and 34 to open slightly and free the stock 18. Again the die jaw portions of the die set 12 are of a known construction; see U.S. Pat No. 4,055,100 issued Oct. 25, 1977 to Alexander Borzym.

The new mechanism by which my die set 12 is reciprocated through the shearing and withdrawal strokes during linear translation relative to the base 10 will now be described. In the embodiment of my invention shown in FIGS. 1, 2, 3, and 4, a heavy rigid cam member 46 has one end pivotally mounted to the base 10 by means of a heavy rigid pivot 48. The other end of the cam member 46 moves through an arcuate displacement path under the control of a toggle linkage 50 the function and purpose of which is hereinafter described. Formed within the cam member 46 is a two-sided cam slot or surface 52 which cooperates with cam follower 54 mechanically connected to and displaceable with the upper shoe 26 of the die set 12.

The cam surface 52 defines a ramp-like path of travel which is aligned with the path of travel of the stock 18 and the path of travel of the carriage 14. During the shearing stroke the cam member 46 is disposed in the angular position best illustrated in FIG. 3 such that linear displacement of the die set 12 under control of the motive power source 20 forces the upper shoe 26 through the down stroke whereupon blade 30 serves the stock 18. At the conclusion of the shearing stroke, the toggle linkage 50 is operated to lift the displaceable end of the cam member 46 to the level position shown by the solid lines in FIG. 4 whereupon the upper shoe is raised and the blade 30 withdrawn from contact with the stock 18. The die set 12 in the carriage 14 may then be retracted to the home position ready for another full cycle of operation.

The toggle linkage 50 which is used to control the angular disposition of the cam member 46 comprises links 60 which connect the displaceable end of the cam member 46 to a crank 62 which is firmly mounted on shaft 64. The shaft is in turn disposed within a bushing 66 and connected for rotation with a bell crank 68, the input end of which is connected to the extensible output shaft 70 of a small bidirectional air cylinder 72. The fixed end of the air cylinder 72 is pivotally mounted to the base 10 at 74 as best shown in FIG. 1. Accordingly, when the output shaft 70 of the air cylinder 72 is fully extended the crank 62 and links 60 are rotated to the position shown in FIG. 1 wherein the pivots are in vertical alignment and the toggle linkage 50 is mechanically locked; i.e., the vertical reaction forces imposed on the cam member 46 by the down stroke or shearing stroke of the die set 12 are directed through the aligned pivots of the links 60 and the shaft 64. To raise cam member 46 to the position shown in FIG. 4 the air cylinder 72 is operated through limit controller 76 to withdraw the output shaft 70 and rotate shaft 64 clockwise until the crank 62 is substantially horizontal as shown in FIG. 4.

Figure 6:
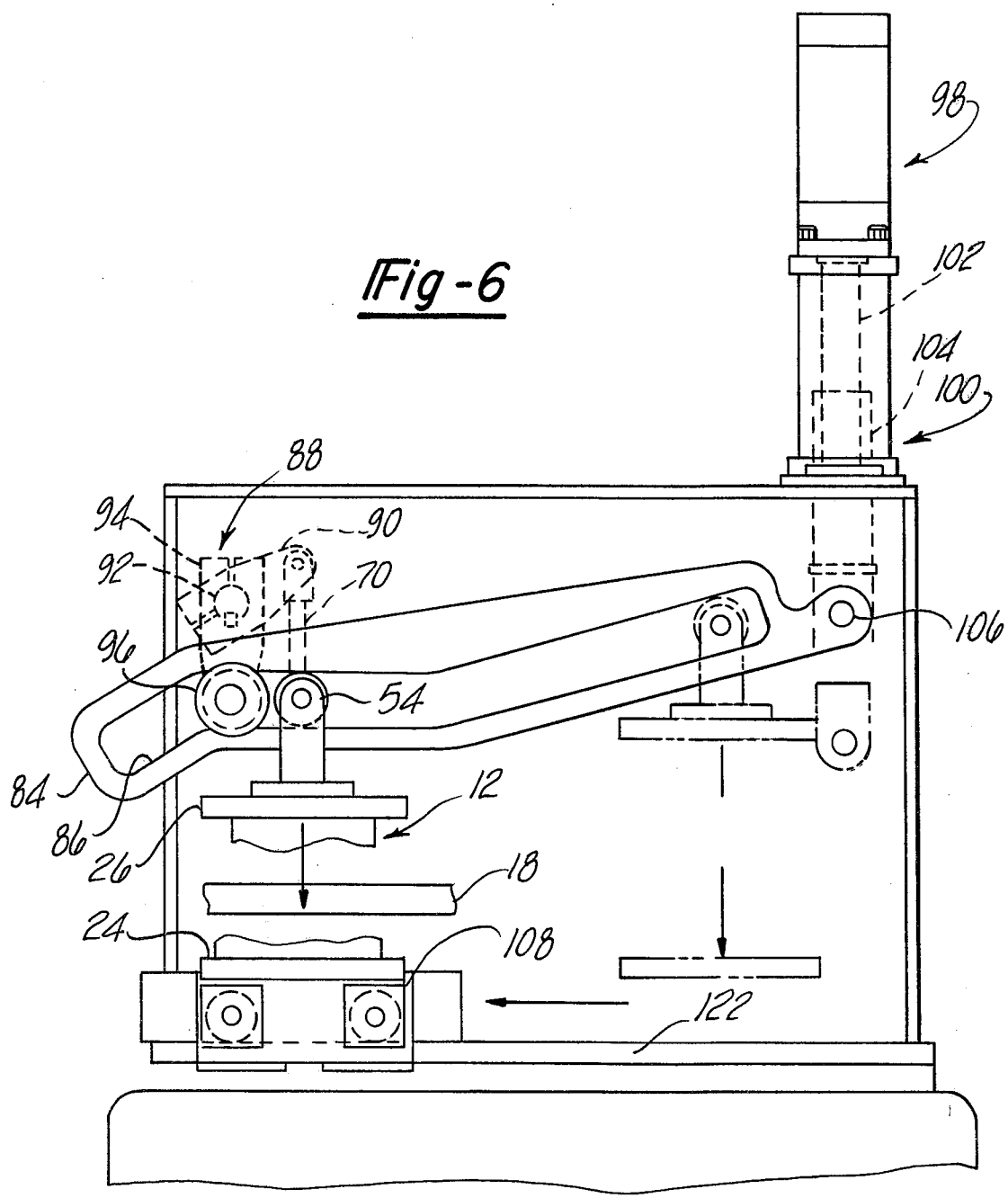
FIG. 6 is a side view of a portion of a cutoff machine showing an embodiment of my invention featuring a hydraulic cylinder providing vertical displacement of the cam member at its pivoted end, and a bell crank cam follower in combination with a downturned cam surface for arcuate displacement of the cam member about its pivoted end.
Figure 8:
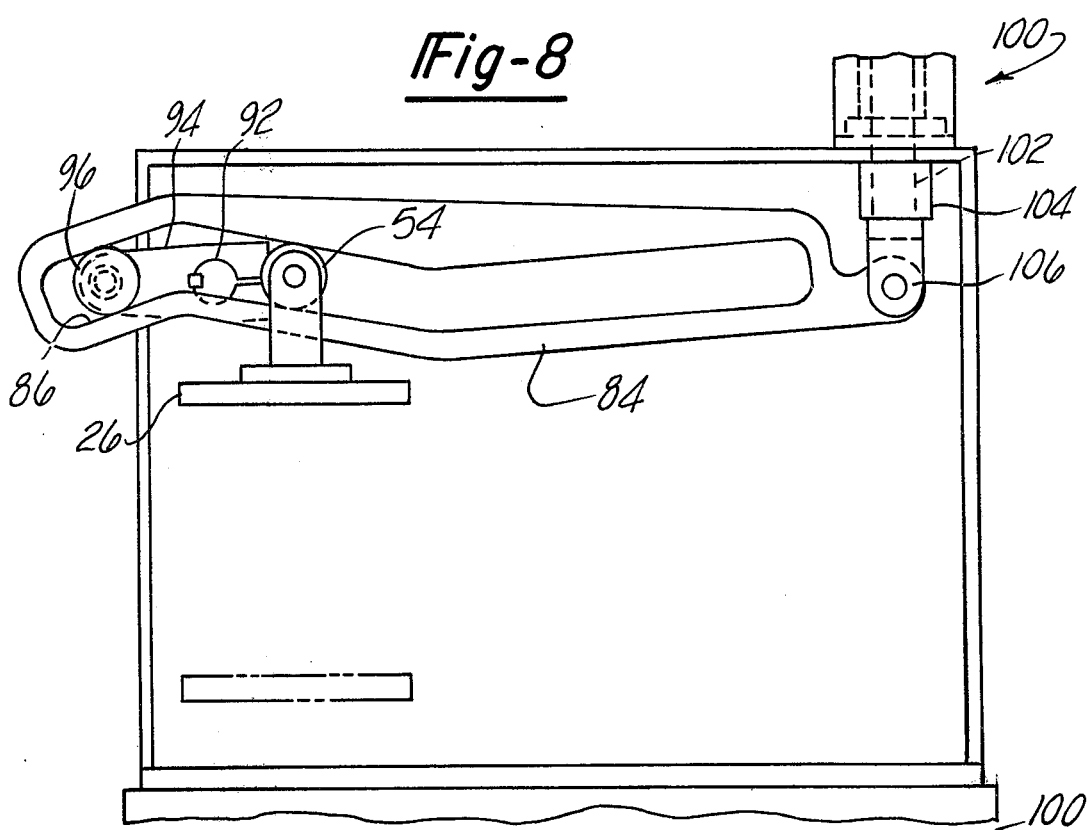
FIG. 8 is a side view of a portion of the mechanism of FIG. 6 showing the cam member with its pivot end held in its normal operating position by the hydraulic cylinder and its opposite end raised by means of the bell crank and follower.

FIG. 6 shows an alternative cam member 84 and crank linkage 88 for angular movement thereof as well as a modified cam shape for more rapid lifting from the cut position. Crank linkage 88 comprises a bell crank 90 one end of which is connected to the output shaft 70 of air cylinder 72. The other end of bell crank 90 is keylock mounted on shaft 92 which is in turn connected for rotation with crank 94. Rotatably mounted at the end of crank 94 is cam lifting roller 96 which operatively engages cam member 84. The angularly displaceable end of cam member 84 is formed to define down turned cam surfaces 88 to increase the lifting speed of cam 84. When the output shaft 70 of air cylinder 72 is fully extended, crank 94 and lifting roller 96 are rotated to the position shown in FIG. 6 wherein the shaft 92 and lifting roller 96 are in vertical alignment to mechanically lock the crank linkage 88 against a vertical reaction force from the down stroke of the die set 12. To raise cam member 84 to the position shown in FIG. 8, the output shaft 70 is withdrawn by air cylinder 72 rotating shaft 92 clockwise until crank 94 is substantially horizontal as shown in FIG. 8. As crank 94 rotates, lifting roller 96 interacts with cam member 84 to lift its angularly displaceable end and thereby raise the upper shoe 26.

Several advantages stem from the use of the crank linkage 88 in place of the toggle linkage 50, two of these being the fewer number of moving parts and the more efficient transfer of power in the former.

The cam member 46 which is shown incorporated into the embodiment of FIGS. 1, 2, 3 and 4 exhibits a straight, i.e., noncurving, cam surface 52 and a pivoted end which is fixed in overall position relative to the base 10. Accordingly, the mechanical advantage of the die set reciprocating mechanism, the stroke length and the relationship between the rate of travel of the upper shoe 26 to the linear travel of the carriage 14 are all fixed in these embodiments. It may be desirable to have the capability of varying their parameters and accordingly the alternative embodiments depicted in FIGS. 5, 6, 7, 8, and 9 are disclosed.

In FIG. 5 a cam member 80 exhibits a curving cam surface 82 such that the rate of vertical travel of the upper shoe 26 relative to the lower shoe 24 is not uniform relative to the rate of travel of the die set 12 on the slide 16 over the entire stroke length produced by the motive power source 20. Rather, the rate of shear travel to slide travel decreases over the stroke length thus giving rise to an increased mechanical advantage toward the bottom of the shear stroke. As is known by those skilled in the art of shearing metal stock such as tubing, it is desirable to increase the power factor toward the bottom of the stroke as it becomes increasingly more difficult to finish the stroke due to the presence of the slug which is caused by the removal of material from the top and side walls of the work during the severing operation. Essentially, this slug must be pushed through the bottom wall of the stock 18 by the blade 30 and hence increased power may be extremely useful toward the bottom of the stroke.

Figure 9:
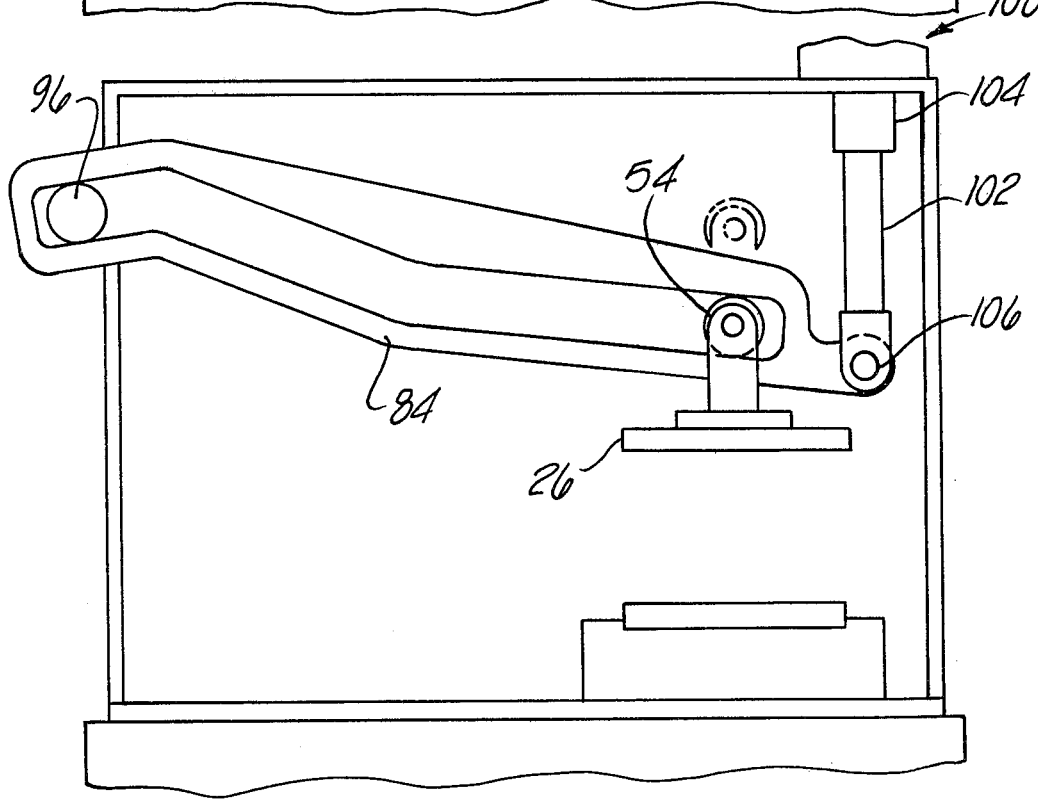
FIG. 9 is a further view of a portion of the mechanism of FIG. 6 showing the pivot end of the cam element lowered by means of the hydraulic cylinder such as to execute a cutting stroke with no linear motion of the carriage.

FIGS. 6, 7, 8, and 9 show an embodiment of the invention having powered means in the form of a hydraulic cylinder 98 which connects with and allows vertical displacement of the pivoted end of cam member 84. Hydraulic cylinder 98 is firmly fixed to the top of the cutoff machine by means of the hydraulic cylinder base generally indicated at 100 and actuates push rod 102 which passes through guide bushing 104 and pivotably connects to cam member 84 at 106. Vertical displacement of the pivot end of cam member 84 via push rod 102 allows adjustments to be made in stroke length and the relationship between the rate of the vertical travel of the upper shoe 26 and the linear travel of the carriage 108 by changing the angle of the cam member 84 makes with the horizontal. In addition, this mechanism can be used to sever stationary stock by extending push rod 102 to drive the upper shoe 26 downward without motive power source 20 imparting linear motion to the die carriage 108 as shown in FIG. 9. This feature is useful in both test and recut operations.

Figure 7:
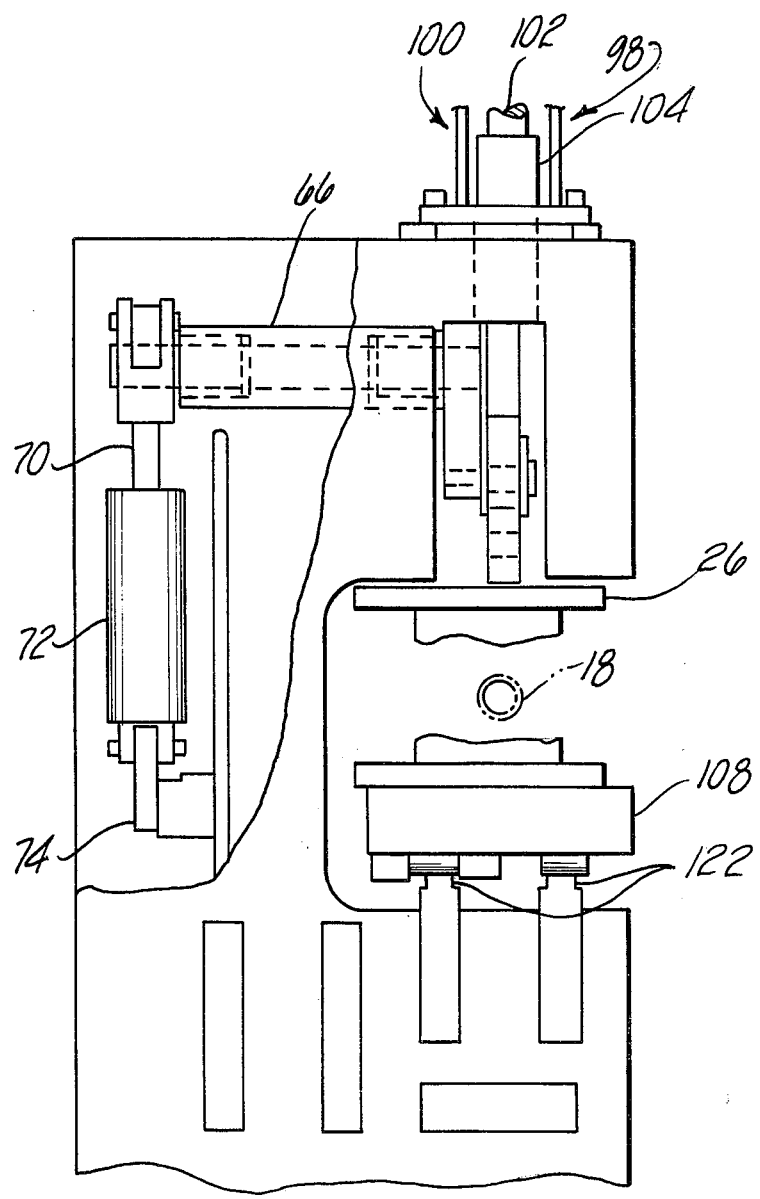
FIG. 7 is an end view of the mechanism of FIG. 6.
Figure 10:
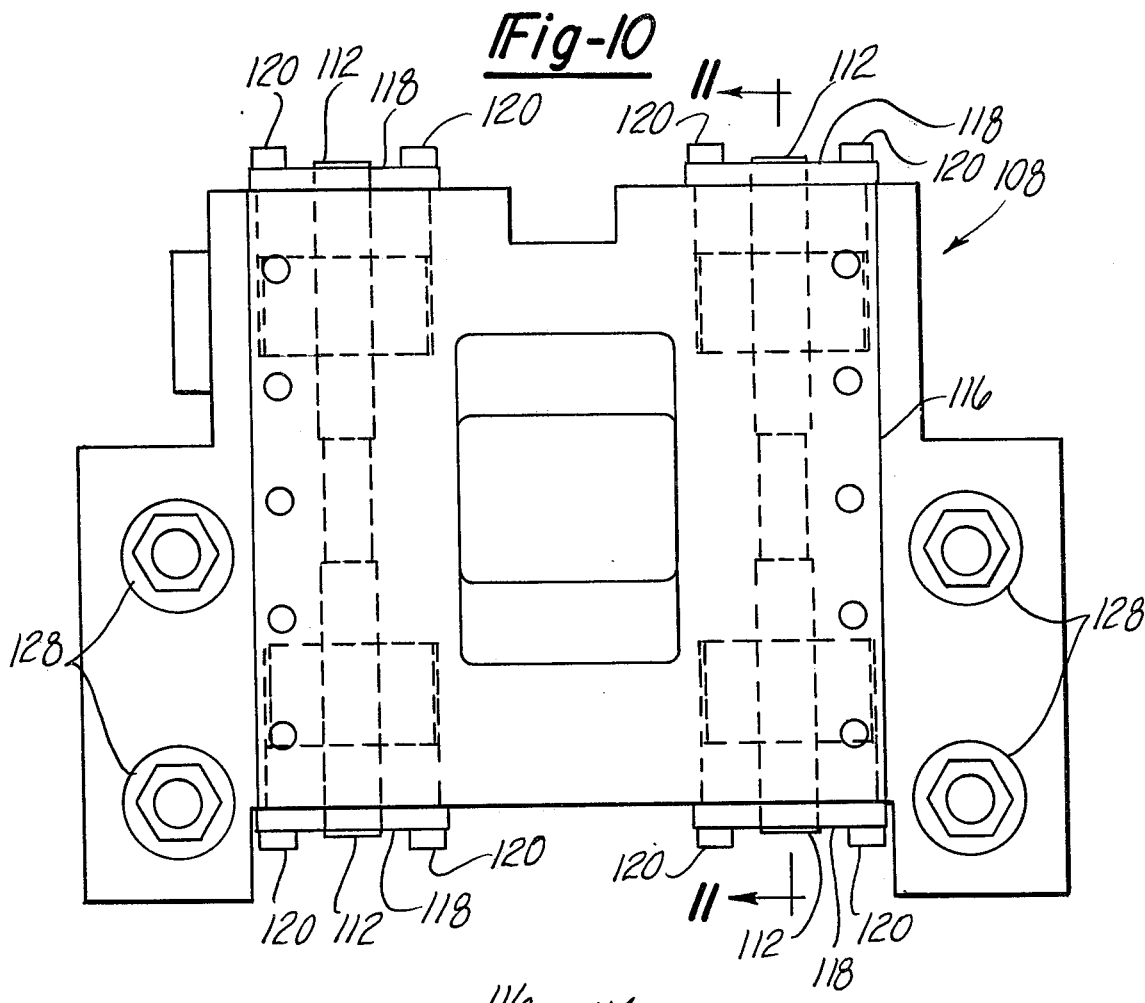
FIG. 10 is a plan view of a wheeled carriage used in my invention for reciprocal motion of the die set along the base.
Figure 11:
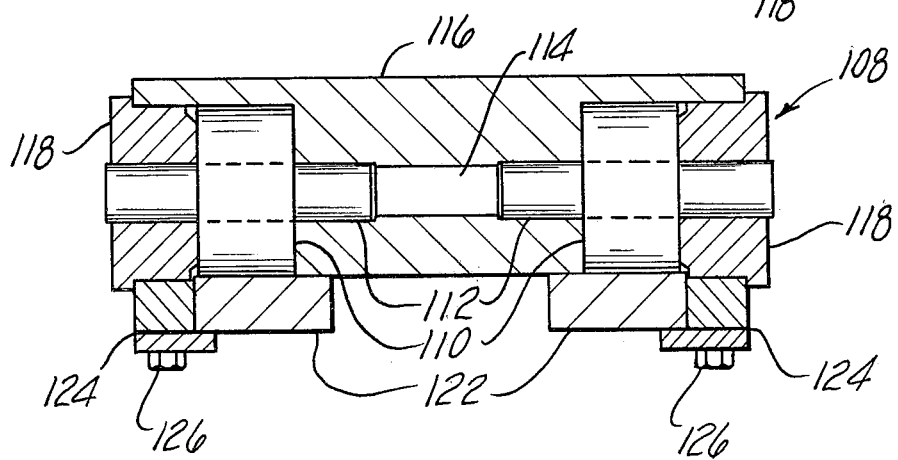
FIG. 11 is a section view of the carriage of FIG. 10 taken along line 11—11.

FIGS. 10 and 11 are detailed drawings of the wheeled carriage 108 shown in use with my invention in FIGS. 6 and 7. The purpose of the carriage 108 is to substantially reduce the power required to translate the die set by reducing sliding friction. This expedient has been found to substantially increase the power from a given accelerator which is available to perform the cut. Carriage 108 is constructed with wheels 110 mounted to axles 112 which are held in channels 114 bored through body 116. Axle caps 118 are connected to the body 116 by bolts 120 and secure the outside ends of axles 112. Wheels 110 roll along rail 122 and are prevented from being displaced vertically or laterally therefrom by aligning means 124 which are connected to axle caps 118 by bolts 126. Aligning means 124 extend downward then inward around the outside of rails 122 as best shown in FIG. 11. Bolts 128 pass vertically through the body 116 and are used to secure die set 12 to carriage 108.

OPERATION

Although it is believed that persons skilled in the art will readily appreciate the operation of the cutoff mechanism from the foregoing specification, a brief and overall description of operation will now be made.

In the embodiment illustrated in FIGS. 1, 2, 3, and 4 motive power source 20 is actuated to retract the die set 12 and the carriage 14 to the home position which is to the right of that shown in FIG. 1, i.e., the position in which the carriage 14 begins its path of travel with the stock 18 at the commencement of a shearing operation.

On signal from a tracking wheel and encoder 130, 132, monitoring the length of stock 18 which has passed through the assembly since the last cutoff stroke, the motive power source 20 is actuated to begin extending the output shaft 22 and accelerating the die carriage 14 in the same direction and speed as the movement of tubular stock 18. At this point air cylinder 72 places the cam member 46 in the full down on angled position shown in FIGS. 1 and 3. In the down position the linkage 50 comprising links 60 and crank 62 are locked in position and the follower roller 54 is at the extreme right-hand position of the cam surface 52, as shown by phantom lines in FIG. 4. Upper shoe 26 is thus raised relative to lower shoe 24 and the blade 30 is above and out of contact with the tubular stock 18.

As the motive power source 20 drives the carriage 14 along with the tubular stock 18 follower roller 54 is driven down the ramp angle of the cam member 46 thus to drive the upper show 26 downwardly through the severing stroke until the follower roller reaches the full left or lower-most position of the cam member 46 as represented in FIGS 1 and 3. Blade 30 severs the stock 18.

On signal from limit control 76, air cylinder 72 is operated to lift the arcuately displaceable end of the cam member 46 and, along therewith, the upper shoe 26 and severing blade 30. When the cam member 46 is in the level position illustrated by solid lines in FIG. 4, motive power source 20 is reversed to pull the die carriage 14 and die set 12 back to the home position for the beginning of another cycle of operation.

The second embodiment as depicted in FIGS. 7, 8 and 9 operates in essentially the same manner as that described above, but with air cylinder 72 actuating cam member 84 by means of crank linkage 88. When motive power source has driven die carriage 108 and die set 12 to the extreme left end of their range of motion as shown in FIG. 6 output shaft 70 is retracted by air cylinder 72 to rotate shaft 92 clockwise and cause lifting roller 96 to raise cam member 84 and die shoe 26 to position shown in FIG. 8. Note the downturn at the left end of cam member 84 allows a given rotation of crank linkage 88 to lift die shoe 26 and blade 30 higher and faster than would be possible with a straight cam.

If it is necessary to adjust stroke length or to change the mechanical advantage provided by the angle between cam member 84 and the horizontal, the hydraulic cylinder 98 is operated to extend or retract push rod 102 and vertically displace the pivoted end of the cam member 84. To execute the cutoff of stationary stock, carriage 108 and die set 12 are held stationary in their retracted position and the push rod 102 is extended as shown in FIG. 9 to drive upper shoe 26 and blade 30 downward through the stock.

It will be appreciated that the motive power source 20 serves, in my invention, not only as the accelerator power source but also as the ramp power source for reciprocating the die set 12. Hence, I have achieved the objective of providing substantially, if not completely, all of the power necessary for the cutting stroke in a flying cutoff from a single simple power source.

The hydraulic cylinder 98 normally plays no part in furnishing the power for the flying cutoff operation but is rather utilized for making static cuts or adjusting the position of cam member 84 while the air cylinder 72 is simply for the purpose of raising and lowering the free end of the cam member 46 or 84 to withdraw the blade from the severed stock 18.

It will be understood that the invention has been described with reference to specific illustrative embodiments and that the foregoing description is not to be construed in a limiting sense.

The embodiments of the invention in which an exclusive property or privilege is claimed are defined as follows:

1. In a machine for shearing linearly moving stock into discrete lengths wherein said machine is of the type having a base, a carriage mounted on the base for movement relative to the base and along a path parallel to the path of movement of the stock, a motive power source for displacing the carriage between extended and retracted positions, and a mechanism mounted on the carriage comprising a shearing element movable through a reciprocal cycle comprising a shearing stroke and a withdrawal stroke to shear the stock, the improvement comprising:

a cam member pivotally mounted on the base adjacent the end of the retracted position of the carriage and aligned with the path of carriage travel, a follower connected to the shearing element and operatively associated with the cam member to drive said element through said shearing stroke as the carriage is moved by the motive power source with and in the direction of the stock using power supplied at least substantially exclusively by said source, and means for permitting angular travel of the other end of the cam member for permitting travel of the shearing element through the withdrawal stroke independently of linear travel of the carriage.

2. Apparatus as defined in claim 1 further including second power means connected operatively to the angularly displaceable end of the cam member for positively driving the shearing element through the withdrawal stroke.

3. Apparatus as defined in claim 1 wherein the means for permitting angular travel comprises a toggle linkage having an extended locked condition corresponding to the shearing stroke and a folded condition corresponding to the withdrawal condition.

4. Apparatus as defined in claim 1 wherein the means for permitting angular travel comprises a bell crank connected to a second follower operatively associated with the cam member, said bell crank and follower assembly having a lowered condition corresponding to the shearing stroke and a raised condition corresponding to the withdrawn condition.

5. Apparatus as defined in claim 4 wherein the angularly displaceable end of the cam member defines cam surfaces angled downward so that motion of the follower along said cam surfaces permits more rapid angular travel of the cam member and thereby travel of the shearing element through the withdrawal stroke independently of linear travel of the carriage.

6. Apparatus for shearing linearly moving stock into discrete lengths, comprising:
a base;
a carriage mounted on said base for travel along a path generally parallel to the movement of said stock;
a first motive power source for displacing said carriage in first and second directions along said path;
shearing mechanism mounted on said carriage including a shearing element reciprocable through a shearing stroke and a withdrawal stroke;

a cam mounted on said base for shifting movement between first and second cam positions respectively associated with said first and second carriage directions;

a cam follower mounted on said carriage and cooperatively coupled with said cam for driving said shearing element through said shearing stroke thereof upon displacement of said carriage in said first direction; and means coupled with said cam for shifting said cam from said first position thereof to said second position thereof independently of the travel of said carriage.

7. Apparatus as defined in claim 6, including means carried by the carriage for clamping said stock as said shearing element is driven through said shearing stroke.

8. Apparatus as defined in claim 6, wherein said cam member is defined by a substantially straight cam surface engaging said follower, whereby the rate of travel of said shearing element through the shearing stroke is linearly related to the rate of travel of said carriage.

9. Apparatus as defined in claim 6, wherein said cam member is defined by a curved surface engaging said follower whereby the rate of travel of said shearing element through the shearing stroke is non-linearly related to the rate of travel of said carriage.

10. Apparatus as defined in claim 6, wherein said shifting means includes a second motive power source operatively coupled with said cam.

11. Apparatus as defined in claim 6, wherein said shifting means includes means for varying the angle of the cam whereby to vary the mechanical advantage of said shearing mechanism.

12. Apparatus as defined in claim 11, wherein:
one extremity of said cam is pivotally mounted on said base, and
said means for varying the angle of said cam is coupled between said second motive power source and the other extremity of said cam to produce displacement of said other extremity of said cam.

13. Apparatus as defined in claim 12, wherein the magnitude of said displacement of said other extremity of said cam is sufficient to reciprocate said shearing element through the shearing stroke independently of linear travel of the carriage.

14. Apparatus as defined in claim 11, wherein said means for varying the angle of said cam comprises a toggle linkage having an extended locked condition corresponding to the shearing stroke and a folded condition corresponding to the withdrawal stroke.

15. Apparatus as defined in claim 11, wherein said means for varying the angle of said cam comprises a bell crank connected to a second follower operatively associated with the cam, said bell crank and follower having a lower condition corresponding to the shearing stroke and a raised condition corresponding to the withdrawal stroke.

16. Apparatus as defined in claim 6, wherein said first motive power means is an air/oil accelerator.

17. Apparatus as defined in claim 6, wherein said carriage comprises a platform adapted to carry a work clamping mechanism and having a plurality of axle mounted wheels on its underside for rolling movement along base mounted tracks and retention means holding the carriage in rolling contact with the tracks and preventing vertical or lateral displacement therefrom.

18. A flying cutoff machine for shearing linearly moving stock comprising: a base; a die set mounted on the base for reciprocal movement along a path parallel to the direction of movement of the stock, the die set comprising reciprocally displaceable upper and lower shoes between which the stock passes, a shearing knife carried by the upper shoe for shearing the stock when the upper shoe is driven toward the lower shoe and clearing the stock for linear travel when retracted from the lower shoe, a first motive power source for reciprocating the die set along said path between extended and retracted positions; a cam member shiftably mounted on the base and aligned with the path of travel; a follower mechanically connected to the upper shoe and operatively connected to the cam member to drive the upper shoe toward the lower shoe to shear the stock as the carriage travels toward the extended position; and, means for altering the angle of said cam member relative to said follower independent of the movement of said carriage, including a second motive power source for shifting said cam.

19. Apparatus as defined in claim 18, wherein said die set further includes die jaws mounted on the lower shoe for clamping the stock, and means operatively connected between the upper shoe and the die jaws for closing the jaws on the stock as the upper shoe travels toward the lower shoe to shear the stock.

20. Apparatus as defined in claim 18, wherein the cam members includes a substantially straight cam surface engagable with the follower such that the rate of travel of the upper shoe through the shearing stroke is linearly related to the rate of travel of the die set along the path of movement thereof.

21. Apparatus as defined in claim 18, wherein said cam member includes a curved surface engagable with the follower whereby the rate of travel of the upper shoe through the shearing stroke is non-linearly related to the rate of travel of the die set parallel to the stock.

22. Apparatus as defined in claim 18, wherein said cam member is pivotably mounted at one end thereof on the base and said means for altering the angle of said cam member includes mechanism coupling said second motive power source with the other end of said cam member.

23. Apparatus as defined in claim 22, wherein said mechanism comprises a linkage having an extended and locked condition corresponding to the shearing stroke of the die set and folded condition corresponding to the withdrawn condition of the die set.

24. Apparatus as defined in claim 23, wherein said linkage includes a bell crank connected to a follower assembly operatively associated with the cam member, said bell crank and follower assembly having a lower position corresponding to the shearing stroke of the die set and a raised position corresponding to the withdrawn condition.

25. Apparatus as defined in claim 24, wherein the angularly displaceable end of the cam member includes cam surfaces angled downward so that the motion of the follower along said cam surface permits more rapid angular travel of the cam member for permitting travel of the upper shoe to a position wherein the knife is withdrawn from the stock independently of linear travel or position of the die set.

* * * * *